(12) United States Patent
Herre et al.

(10) Patent No.: US 7,465,130 B2
(45) Date of Patent: Dec. 16, 2008

(54) POWDER FEED PUMP AND APPROPRIATE OPERATING SYSTEM

(75) Inventors: Frank Herre, Oberriexingen (DE); Hans-Georg Fritz, Osfildern (DE); Thomas Dürr, Tamm (DE)

(73) Assignee: Durr Systems, Inc., Plymouth, MI (US)

( * ) Notice: Subject to any disclaimer, the term of this patent is extended or adjusted under 35 U.S.C. 154(b) by 577 days.

(21) Appl. No.: 10/948,513

(22) Filed: Sep. 23, 2004

(65) Prior Publication Data
US 2005/0178325 A1 Aug. 18, 2005

(30) Foreign Application Priority Data
Feb. 18, 2004 (DE) .................. 10 2004 007 967

(51) Int. Cl.
*B65G 53/10* (2006.01)
(52) U.S. Cl. .................... 406/50; 406/145
(58) Field of Classification Search .............. 406/50, 406/145
See application file for complete search history.

(56) References Cited

U.S. PATENT DOCUMENTS

| | | | |
|---|---|---|---|
| 2,667,280 A | 1/1954 | Lane et al. ............ 214/152 |
| 3,882,899 A | 5/1975 | Ginsberg et al. ........ 137/627.5 |
| 4,517,099 A * | 5/1985 | Breckner ................ 210/741 |
| 6,079,461 A * | 6/2000 | Fisher et al. ............ 141/231 |
| 6,325,572 B1 | 12/2001 | Dietrich ................ 406/171 |
| 6,419,425 B1 * | 7/2002 | Fourcroy et al. ......... 406/120 |
| 6,478,513 B1 * | 11/2002 | Higuchi et al. .......... 406/19 |
| 6,508,610 B2 | 1/2003 | Dietrich ................ 406/13 |
| 6,953,315 B2 * | 10/2005 | Cartwright ............ 414/217 |
| 7,144,213 B2 * | 12/2006 | Cartwright ............ 414/217 |
| 7,150,585 B2 * | 12/2006 | Kleineidam et al. ........ 406/50 |
| 7,153,065 B2 * | 12/2006 | Lowell ................ 406/110 |
| 7,163,359 B2 * | 1/2007 | Moser ................. 406/74 |
| 7,241,080 B2 * | 7/2007 | Klobucar et al. .......... 406/50 |
| 2005/0019106 A1 * | 1/2005 | Moser ................ 406/73 |

FOREIGN PATENT DOCUMENTS

DE 2437799 2/1976

* cited by examiner

*Primary Examiner*—Douglas A Hess
(74) *Attorney, Agent, or Firm*—Rader, Fishman & Grauer PLLC.

(57) ABSTRACT

An operating system for a power feed pump and a power feed pump having a transfer chamber with an inlet and an outlet. The outlet of the transfer chamber is closed, the inlet of the transfer chamber is opened, and a negative pressure is generated in the transfer chamber to suck a powder in through the inlet to the transfer chamber. The inlet of the transfer chamber is closed, the outlet of the transfer chamber is opened, and the powder in the transfer chamber is delivered through the outlet. The negative pressure in the transfer chamber is built up at least partially before the inlet of the transfer chamber is opened.

10 Claims, 2 Drawing Sheets

POWDER FEED PUMP AND APPROPRIATE OPERATING SYSTEM

FIELD OF THE INVENTION

The invention relates to an operating system for a powder feed pump and an appropriately configured powder feed pump to perform the inventive operating procedure.

BACKGROUND OF THE INVENTION

In powder coating installations, the so-called dilute-phase process was used to convey the powder used as the coating material. In this process the powder was conveyed in a fluidized state in a gas stream through hose-like conveyor lines to the application device (e.g., a spray gun or rotary atomizer). The term dilute-phase is derived from the fact that the proportion of powder in the powder-air mixture conveyed is relatively low, so that the hose-like transfer lines have to have a correspondingly large cross-section in order to convey the required volume of powder.

For this reason, so-called dense phase powder conveying was proposed, which has a higher proportion of powder in the powder-air mixture conveyed. The actual transfer of the powder can take place by means of a feed pump, designated as a PDF pump, which has a transfer chamber with an inlet and an outlet. Powder is sucked into the transfer chamber through the inlet and is then discharged through the outlet to reach an application device (e.g., a spray gun or rotary atomizer). To fill the transfer chamber, the outlet of the transfer chamber is first closed in order to suck powder from a powder hopper. Then a negative pressure is created in the transfer chamber by sucking air out of the transfer chamber through a filter element, the filter element being permeable to air but impermeable to powder so that the powder in the transfer chamber is not sucked out. After the transfer chamber has been adequately filled, suctioning of the air stops, and the inlet valve is closed. To discharge the powder in the transfer chamber, the outlet is opened and compressed air is blown into the transfer chamber through the filter element, discharging the powder from the transfer chamber. Powder is conveyed from the powder reservoir to the application device through the cyclical operation of the previously described suction and discharge phases. The transfer chamber can consist of a hose or pipe section whose hollow cylindrical wall is gas-permeable but powder-impermeable and thus forms the filter element, where the inlet to the transfer chamber can be closed by an inlet valve, and the outlet from the transfer chamber can be closed by an exhaust valve.

The disadvantage of this prior art powder feed pump for dense phase powder conveying is the unsatisfactory accuracy of the metering process.

SUMMARY OF THE INVENTION

The object of the invention is therefore to improve the metering accuracy of the previously-described powder feed pump.

The invention is based on the finding that the unsatisfactory metering accuracy of the prior art feed pump is the consequence of fluctuations in the build-up of negative pressure in the transfer chamber, which cause corresponding fluctuations in the volume of powder sucked in and subsequently discharged.

The invention embraces the general technical teaching of building up the negative pressure in the transfer chamber at least partially before the inlet to the transfer chamber is opened. The inlet to the transfer chamber is therefore not opened until negative pressure has already built up in the transfer chamber. This has the advantage that fluctuations in the buildup of negative pressure in the transfer chamber have less effect on the accuracy of the metering. The powder feed pump in accordance with the invention therefore has an inlet valve and a suction valve that can be actuated independently of each other in order to open the suction valve first before opening the inlet valve so that negative pressure is built up in the transfer chamber.

Preferably the generation of negative pressure in the transfer chamber is terminated even before the inlet of the transfer chamber is opened. The phase of generating negative pressure and the suction phase preferably do not overlap in time. This has the advantage that when air is sucked out of the transfer chamber, the closed inlet prevents any powder from being sucked out, which would be undesirable. For this reason, not even a filter element is necessary when sucking air out of the transfer chamber, which allows a higher negative pressure to be created in the transfer chamber with a given expenditure of equipment. Preferably however, as part of the scope of the invention, the suctioning from the transfer chamber is carried out through a filter element to prevent the suctioning of residual powder that might still possibly remain in the transfer chamber.

The inlet to the transfer chamber is preferably not opened until a specified negative pressure has built up in the transfer chamber. This has the advantage that specified pressure conditions obtain at the beginning of the suction phase so that the volume of powder sucked in can easily be calculated and controlled or regulated.

To this end, the negative pressure in the transfer chamber can be measured by a pressure sensor, with a control unit closing the suction valve and simultaneously, or with a delay, opening the inlet valve when the negative pressure measured in the transfer chamber has reached a specified threshold value.

However, as an alternative, it is also possible that before the inlet valve is opened, a specified negative pressure is built up in the transfer chamber by opening the suction valve for a specified period in accordance with the negative pressure desired, whereby the functional connection between the opening duration of the suction valve and the resulting negative pressure can be determined by tests.

The delivery of the powder in the transfer chamber through the outlet preferably takes place by discharging the powder from the transfer chamber. To achieve this, a positive pressure connection preferably opens into the transfer chamber, through which a fluid can be introduced into the transfer chamber to discharge the powder, where the positive pressure connection can be closed by a discharge valve. The discharge valve can preferably be controlled independently of the inlet valve, the exhaust valve and/or the suction valve. This has the advantage that the phase of generating negative pressure, the induction phase, the outlet phase and the exhaust phase can be controlled independently of each other to achieve optimal transfer characteristics.

In contrast to the prior art PDF pump described at the beginning, the fluid to discharge the powder from the transfer chamber (e.g., compressed air) is preferably introduced directly into the transfer chamber, bypassing the filter element. This has the advantage that the build up of pressure in the transfer chamber when the powder is discharged is not hampered by the filter element, allowing the transfer chamber to be emptied more quickly.

In addition, as part of the invention, purging of the transfer chamber can take place by introducing a purging fluid, e.g., compressed air, into the transfer chamber. In contrast to the prior art PDF pump described at the beginning, the purging fluid is introduced through the filter element and not directly into the transfer chamber. This has the advantage of a slower pressure buildup in the transfer chamber during the purging operation, thereby reducing the danger of the transfer hose bursting. However, as part of the invention, the alternative possibility exists that the purging fluid is introduced directly into the transfer chamber, bypassing the filter element.

Preferably the length of a complete working cycle, including negative pressure generation phase, induction phase and discharge phase lies in the range between 200 ms and 1 second, while any values in between are possible. A value of 500 ms for the cycle length is especially advantageous.

The negative pressure generation phase, the induction phase and the discharge phase can be of different lengths or of the same length, where values between 50 ms and 200 ms or any values within this interval are possible. A duration of 150 ms for the negative pressure generation phase, the induction phase and/or the discharge phase has proved to be advantageous. However, the invention is not restricted to the values heretofore mentioned for the duration of the negative pressure generation phase, the induction phase and the discharge phase, but can be implemented in its essentials using other values.

It must furthermore be mentioned that delay periods preferably come between the negative pressure generation phase, the induction phase and/or the discharge phase, which can be in the range of 20 ms to 200 ms, for example. These delay periods are intended to ensure that the valves in question have reached the required valve position after being suitably actuated. The invention is, however, not limited to the duration of the delay times with respect to the previously described values, but can be implemented in its essentials with other values for the delay times.

Finally, it should be mentioned that the invention is not restricted to a feed pump as an individual part, but rather also comprises a powder coating system with a feed pump of this type.

Other advantageous further developments of the invention are described in greater detail in what follows together with the description of the preferred embodiment of the invention with reference to the illustrations.

DETAILED DESCRIPTION

Figure 1:
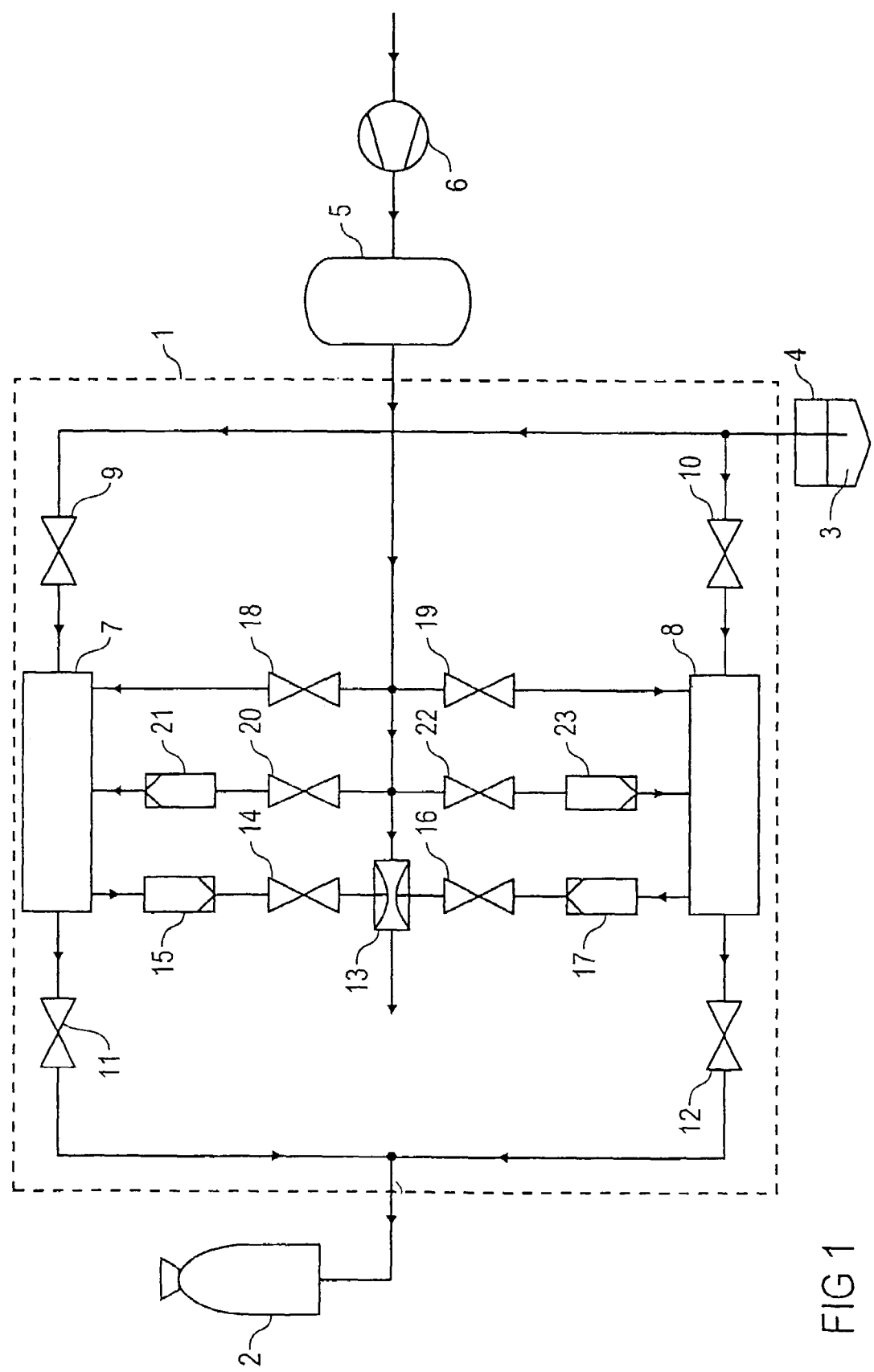
FIG. 1 shows a fluid flow schematic of a preferred embodiment of a powder coating installation with an inventive powder feed pump.

The fluid flow diagram in FIG. 1 shows a powder coating installation with an inventive powder feed pump 1 to supply powder to a rotary atomizer 2, where the rotary atomizer 2 can be constructed in the traditional manner and consequently does not need to be described further in what follows. In place of the rotary atomizer 2, another powder application device, such as a spray gun for example, can be employed.

To receive a powder 3 serving as a coating means, the powder feed pump 1 is connected on the input side to a powder reservoir, or hopper, 4, where the powder hopper 4 can be similarly constructed in a traditional manner and is therefore not described in more detail in what follows.

The powder feed pump 1 is additionally connected on the inlet side to a compressed air accumulator 5 which is supplied by a compressed air pump 6.

The powder feed pump 1 has two branches laid out in parallel to convey powder, each with a transfer chamber 7, 8.

The two transfer chambers 7, 8 each have an inlet where the two inlets of the transfer chambers 7, 8 are connected by way of an inlet valve 9, 10 to the powder hopper 4. With the inlet valve 9, 10 open, the powder 3 can be sucked out of the powder hopper 4 into the transfer chambers 7, 8, as will be described in more detail.

Further, the transfer chambers 7, 8 each have an outlet, where the two outlets of the transfer chambers 7, 8 are connected to the rotary atomizer 2 by way of an exhaust valve 11, 12. With the exhaust valve 11, 12 open, the powder 3 present in the transfer chambers 7, 8 can be discharged from the transfer chambers 7, 8, as will also be described in more detail.

The inlet valves 9, 10 and the exhaust valves 11, 12 can be configured here as pinch valves, by example, which can be driven pneumatically, hydraulically or electrically.

To suck the powder 3 through the inlet valves 9, 10 into the transfer chambers 7, 8, the powder feed pump 1 has a negative pressure generator 13 which is intrinsically of traditional construction. The negative pressure generator 13 has an injector nozzle, which is supplied with compressed air from the compressed air accumulator 5 and which generates negative pressure at a connection in accordance with the venturi principle.

The negative pressure connection of the negative pressure generator 13 is connected to the transfer chamber 7 by a suction valve 14 and a filter element 15, and to the transfer chamber 8 by a suction valve 16 and a filter element 17. When the suction valve 14 is opened, the negative pressure generator 13 sucks air out of the transfer chamber 7 through the filter element 15, generating in the transfer chamber 7 a negative pressure to suck the powder 3 out of the powder reservoir 4. In the same way, the negative pressure generator 13 generates a negative pressure in the transfer chamber 8 when the suction valve 16 is open.

The two filter elements 15, 17 are not separate components but can consist of the walls of the hollow cylindrical transfer chambers 7, 8, which walls are pervious to air but impervious to powder.

The compressed air accumulator 5 is connected not only to the negative pressure generator 13 to generate a negative pressure in the transfer chambers 7, 8 but also serves to discharge the powder 3 from the transfer chambers 7, 8. To do this, the compressed air accumulator 5 is connected through a discharge valve 18 to the transfer chamber 7 and through a second discharge valve 19 to the transfer chamber 8. With the discharge valves 18, 19 in an open state, compressed air is blown in from the compressed air accumulator 5 into the transfer chambers 7, 8. As a result, the powder 3 in the transfer chambers 7, 8 is discharged from the transfer chambers 7, 8 as long as the exhaust valves 11, 12 are open. It is important that the exhaust valves 18, 19 open directly into the transfer chambers 7, 8, bypassing the filter elements 15, 17. This has the advantage that the pressure buildup in the transfer chambers 7, 8 when the powder 3 is discharged from the transfer chambers 7, 8 is not slowed by the aerodynamic resistance of the filter elements 15, 17. The direct supply of the compressed air into the transfer chambers 7, 8 advantageously makes possible a more rapid buildup of pressure and thus rapid emptying of the transfer chambers 7, 8.

The compressed air stored in the compressed air accumulator 5 does not serve only to discharge the powder 3 in the transfer chambers 7, 8 but also to purge the transfer chambers 7, 8. For this purpose, the compressed air accumulator 5 is connected by way of a purge valve 20 and a filter element 21 to the transfer chamber 7 and is connected in similar fashion by way of a purge valve 22 and a filter element 23 to the transfer chamber 8. The compressed air accumulator 5 blows compressed air into the transfer chamber 7 for purging purposes when the purge valve 20 is opened. Similarly, compressed air is blown into the transfer chamber 8 for purging purposes when the purge valve 22 is open.

The two filter elements 21, 23 are also not independent components, but can consist of the walls of the hollow cylindrical transfer chambers 7, 8, which walls are pervious to air but impervious to powder.

The provision of purge air through the filter elements 21, 23 has the advantage that the pressure buildup in the purge operation takes place more slowly, whereby the risk of a conveyor hose bursting during the purge operation is reduced.

Figure 2:
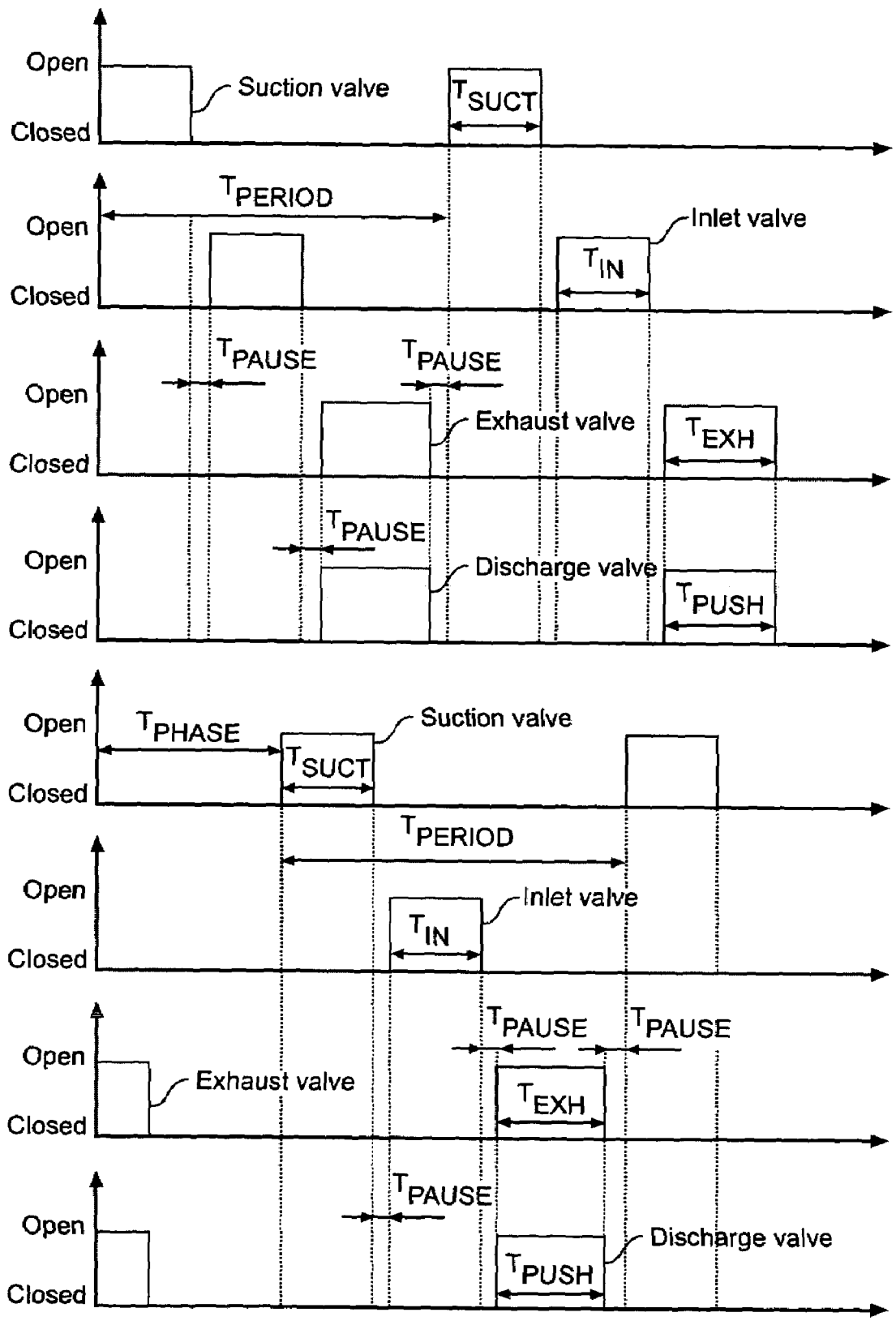
FIG. 2 shows several time charts to clarify the opening and closing patterns of the individual valves of the inventive powder feed pump from FIG. 1.

In what follows, the inventive operating system of the feed pump 1 is described with reference to FIG. 2. The four upper time charts in FIG. 2 show from top to bottom the chronological opening characteristics of the suction valve 14, of the inlet valve 9, of the exhaust valve 11 and of the discharge valve 18. The four lower time charts in FIG. 2 show in contrast from top to bottom the chronological opening characteristics of the suction valve 16, of the inlet valve 10, of the exhaust valve 12 and of the discharge valve 19.

At the beginning of an operating cycle, the suction valve 14 is opened, while the inlet valve 9, the exhaust valve 11 and the discharge valve 18 are closed. The opening of the suction valve 14 lasts for a time $T_{SUCT}$, which can be in a range between 50 ms and 200 ms. During this phase of generating negative pressure, a specified negative pressure is generated in the transfer chamber 7, which is later exploited to suck the powder 3 into the transfer chamber 7, as will be described in greater detail.

When the phase of generating negative pressure is complete, the suction valve 14 is closed. At the same time the inlet valve 9, the exhaust valve 11 and the discharge valve 18 remain closed during a specified delay period $T_{PAUSE}$. The delay time $T_{PAUSE}$ is in the range between 10 ms and 200 ms and ensures that no there are no time overlaps in the individual phases of an operating cycle.

After the delay time $T_{PAUSE}$ has expired, the inlet valve 9 is then opened, so that the negative pressure previously built up in the transfer chamber 7 sucks the powder 3 out of the powder reservoir 4, which fills the transfer chamber 7 with powder 3. The inlet valve 9 is opened for a period $T_{IN}$, which can be in the range of between 50 ms and 200 ms. When this inlet phase is over the inlet valve 9 is closed, while the exhaust valve 11, the discharge valve 18 and the suction valve 14 also remain closed initially during a further delay period.

After this delay period has expired, the exhaust valve 11 and the discharge valve 18 are opened simultaneously, so that compressed air is blown out of the compressed air accumulator 5 into the transfer chamber 7, whereby the powder 3 in the transfer chamber 7 is discharged by way of the exhaust valve 11. The opening phase of the exhaust valve 11 can be of a duration of $T_{EXH}$, in the range between 50 ms and up to 200 ms. The opening phase of the exhaust valve 18 can also have a duration of $T_{PUSH}$, lying in the range between 50 ms and 200 ms.

After the outlet and exhaust phases are over, the exhaust valve 11 and the discharge valve 18 are closed. The inlet valve 9 and the suction valve 14 also remain closed for a delay period. After this delay period has expired, the previously described operating cycle is repeated cyclically, where one cycle has a periodic duration of $T_{PERIOD}$, which can be 500 ms as an example.

The inlet valve 10, the exhaust valve 12, the discharge valve 19 and the suction valve 16 are operated in the same way, but a phase shift $T_{PHASE}$ is provided, which can be in the range of 250 ms.

The advantage to the lack of chronological overlap in the phase of generating negative pressure and the suction phase is the fact that at the beginning of the induction phase a specified negative pressure was produced in the transfer chamber, 7 or 8, so that the transfer volume can be determined precisely in advance.

The direct connection between the discharge valves 18, 19 and the transfer chambers 7, 8 that bypasses the filter elements 15, 17, 21, 23 has the advantage that the pressure buildup is not hampered by the filter elements 15, 17, 21, 23, which allows the transfer chambers 7, 8 to be emptied more quickly.

The invention is not restricted to the previously described preferred embodiment. Rather, a plurality of variations and derivations is possible that similarly make use of the inventive concept and therefore are similarly protected.

What is claimed is:

1. A method of operating a powder feed pump having a transfer chamber with an inlet and an outlet, the method comprising the steps of:
    closing the outlet of the transfer chamber; opening the inlet of the transfer chamber after the step of closing the outlet of the transfer chamber to allow powder into the transfer chamber;
    generating a negative pressure in the transfer chamber after the step of closing the outlet of the transfer chamber wherein the negative pressure in the transfer chamber is at least partially built up before the step of opening the inlet of the transfer chamber;
    closing the inlet of the transfer chamber after a start of the generating step;
    opening the outlet of the transfer chamber after the step of closing the inlet of the transfer chamber; and delivering the powder present in the transfer chamber through the outlet,
    wherein the step of delivering powder present in the transfer chamber through the outlet further comprises the step of introducing a fluid into the transfer chamber to discharge the powder from the transfer chamber.

2. The method according to claim 1 wherein the step of generating the negative pressure in the transfer chamber further comprises the step of generating a predetermined negative pressure in the transfer chamber prior to the step of opening the inlet of the transfer chamber.

3. The method according to claim 1 wherein the step of generating the negative pressure in the transfer chamber further comprises the step of generating the negative pressure in the transfer chamber for a predetermined period of time prior to the step of opening the inlet of the transfer chamber.

4. The method according to claim 1 wherein the step of generating the negative pressure in the transfer chamber further comprises the step of suctioning a gas out of the transfer chamber through a filter element.

5. The method according to claim 4 wherein the step of introducing the fluid into the transfer chamber further comprises the step of bypassing the filter element of the transfer chamber.

6. The method according to claim 4, further comprising the step of: delaying the step of opening the outlet of the transfer chamber for a specified delay period after the step of closing the inlet of the transfer chamber.

7. The method according to claim 1 wherein the step of introducing the fluid into the transfer chamber further comprises the step of bypassing a filter element of the transfer chamber.

8. The method according to claim 1 wherein the step of introducing the fluid into the transfer chamber further comprises the step of introducing the fluid into the transfer chamber through a controllable discharge valve in the transfer chamber.

9. The method according to claim 1, further comprising the step of: introducing a purging fluid into the transfer chamber through a filter element to purge the transfer chamber.

10. The method according to claim 1, further comprising the step of: delaying the step of opening the outlet of the transfer chamber for a specified delay period after the step of closing the inlet of the transfer chamber.

* * * * *

UNITED STATES PATENT AND TRADEMARK OFFICE
CERTIFICATE OF CORRECTION

| | | |
|---|---|---|
| PATENT NO. | : 7,465,130 B2 | Page 1 of 1 |
| APPLICATION NO. | : 10/948513 | |
| DATED | : December 16, 2008 | |
| INVENTOR(S) | : Frank Herre et al. | |

It is certified that error appears in the above-identified patent and that said Letters Patent is hereby corrected as shown below:

On the title page item [57] Abstract, line 1, please change "power" to --powder--, in both instances Signed and Sealed this Tenth Day of March, 2009

JOHN DOLL
*Acting Director of the United States Patent and Trademark Office*